US010613338B2

(12) United States Patent
Blonde et al.

(10) Patent No.: US 10,613,338 B2
(45) Date of Patent: Apr. 7, 2020

(54) APPARATUS AND A METHOD FOR CALIBRATING AN OPTICAL AQUISITION SYSTEM (71) Applicant: THOMSON Licensing, Issy-les-Moulineaux (FR)

(72) Inventors: Laurent Blonde, Thorigné-Fouillard (FR); Valter Drazic, Betton (FR); Mozhdeh Seifi, Thorigne-Fouillard (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 5 days.

(21) Appl. No.: 15/759,222

(22) PCT Filed: Sep. 16, 2016

(86) PCT No.: PCT/EP2016/072072
§ 371 (c)(1),
(2) Date: Mar. 11, 2018

(87) PCT Pub. No.: WO2017/046397
PCT Pub. Date: Mar. 23, 2017

(65) Prior Publication Data
US 2018/0252928 A1 Sep. 6, 2018

(30) Foreign Application Priority Data
Sep. 17, 2015 (EP) .................................... 15306447

(51) Int. Cl.
*G02B 27/00* (2006.01)
*G02B 27/09* (2006.01)
(Continued)

(52) U.S. Cl.
CPC ..... *G02B 27/0955* (2013.01); *G02B 27/0012* (2013.01); *G02B 27/0075* (2013.01);
(Continued)

(58) Field of Classification Search
CPC ............ G02B 27/0955; G02B 27/0012; G02B 27/0075; G06T 7/80; G06T 2200/21; G06T 2207/10052; H04N 5/225
(Continued)

(56) References Cited

U.S. PATENT DOCUMENTS 8,243,157 B2 8/2012 Ng et al.
8,358,354 B2 1/2013 Ng et al.
(Continued)

FOREIGN PATENT DOCUMENTS

CN 104849852 A 8/2015
RU 2653772 C1 5/2018

OTHER PUBLICATIONS

Ng et al., "Light Field Photography with a Hand-held Plenoptic Camera", Stanford University Computer Science Technical Report, CSTR 2005-02, Apr. 2005, pp. 1-11.
(Continued)

*Primary Examiner* — William Choi
(74) *Attorney, Agent, or Firm* — Brian J. Dorini, Esquire; Robert D. Shedd, Esquire (57) ABSTRACT There are several types of plenoptic devices and camera arrays available on the market, and all these light field acquisition devices have their proprietary file format. However, there is no standard supporting the acquisition and transmission of multi-dimensional information. It is interesting to obtain information related to a correspondence between pixels of a sensor of said optical acquisition system and an object space of said optical acquisition system. Indeed, knowing which portion of the object space of an optical acquisition system a pixel belonging to the sensor of said optical acquisition system is sensing enables the improvement of signal processing operations. The notion of pixel beam, which represents a volume occupied by a set of
(Continued)

rays of light in an object space of an optical system of a camera along with a compact format for storing such information is thus introduce.

17 Claims, 5 Drawing Sheets (51) Int. Cl.
    *H04N 5/225* (2006.01)
    *G06T 7/80* (2017.01)
(52) U.S. Cl.
    CPC .............. *G06T 7/80* (2017.01); *H04N 5/225* (2013.01); *G06T 2200/21* (2013.01); *G06T 2207/10052* (2013.01)
(58) Field of Classification Search
    USPC .................. 359/642; 348/222.1; 250/208.1
    See application file for complete search history.

(56) References Cited

U.S. PATENT DOCUMENTS

| | | |
|---|---|---|
| 10,136,078 B2 | 11/2018 | Han et al. |
| 2013/0250099 A1 | 9/2013 | Iijima et al. |
| 2014/0263963 A1 | 9/2014 | Broxton et al. |
| 2015/0146032 A1 | 5/2015 | Rime et al. |
| 2017/0243374 A1* | 8/2017 | Matsuzawa ............ G01B 11/00 |

OTHER PUBLICATIONS

Anonymous, "An Experimental Plenoptic Camera", http://cameramaker.se/plenoptic.htm, Jan. 2016, pp. 1-2.

Levin et al., "Understanding camera trade-offs through a Bayesian analysis of light field projections", 10th European Conference on Computer Vision (ECCV), Marseille, France, Oct. 12, 2008, pp. 88-101.

Park et al., "Light ray field capture using focal plane sweeping and its optical reconstruction using 3D displays", Optics Express, vol. 22, No. 21, Oct. 20, 2014, pp. 25444-25454.

Ng, R., "Digital Light Field Photography", Stanford University, Department of Computer Science, Doctoral Dissertation, Jul. 2006, pp. 1-203.

Wanner et al., "Generating EPI Representations of 4D Light Fields with a Single Lens Focused Plenoptic Camera", 7th International Symposium on Visual Computing (ISVC 2011), Las Vegas, Nevada, USA, Sep. 26, 2011, pp. 90-101.

* cited by examiner

Fig. 8 ial application PCT/EP2016/072072, under 35 U.S.C. § 365, filed on Sep. 16, 2016, which was published in accordance with Article 21(2) on Mar. 23, 2017, in English, and which claims the benefit of European Patent Application No. 15306447.2, filed on Sep. 17, 2015.

APPARATUS AND A METHOD FOR CALIBRATING AN OPTICAL AQUISITION SYSTEM

This application claims the benefit of International Appli-

TECHNICAL FIELD

The present invention relates to generation of data representing a light field.

BACKGROUND

The acquisition of four-dimensional or 4D light-field data, which can be viewed as a sampling of a 4D light field, i.e. the recording of light rays, is explained in the article "*Understanding camera trade-offs through a Bayesian analysis of light field projections*" by Anat Levin and al., published in the conference proceedings of ECCV 2008 is an hectic research subject.

Figure 1A:
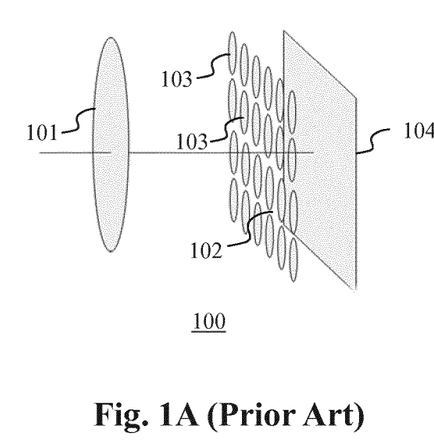
FIG. 1A is a diagram schematically representing a plenoptic camera.

Compared to classical two-dimensional or 2D images obtained from a camera, 4D light-field data enable a user to have access to more post-processing features that enhance the rendering of images and the interactivity with the user. For example, with 4D light-field data, it is possible to perform refocusing of images with freely selected distances of focalization meaning that the position of a focal plane can be specified/selected a posteriori, as well as changing slightly the point of view in the scene of an image. In order to acquire 4D light-field data, several techniques can be used. For example, a plenoptic camera is able to acquire 4D light-field data. Details of the architecture of a plenoptic camera are provided in FIG. 1A. FIG. 1A is a diagram schematically representing a plenoptic camera 100. The plenoptic camera 100 comprises a main lens 101, a micro-lens array 102 comprising a plurality of micro-lenses 103 arranged in a two-dimensional array and an image sensor 104.

Figure 1B:
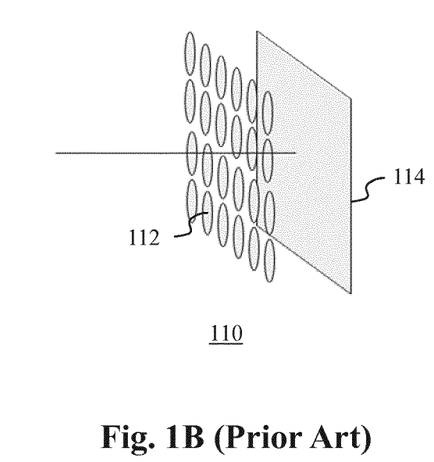
FIG. 1B represents a multi-array camera.

Another way to acquire 4D light-field data is to use a camera array as depicted in FIG. 1B. FIG. 1B represents a multi-array camera 110. The multi-array camera 110 comprises a lens array 112 and an image sensor 114.

In the example of the plenoptic camera 100 as shown in FIG. 1A, the main lens 101 receives light from an object (not shown on the figure) in an object field of the main lens 101 and passes the light through an image field of the main lens 101.

At last, another way of acquiring a 4D light field is to use a conventional camera that is configured to capture a sequence of 2D images of a same scene at different focal planes. For example, the technique described in the document "*Light ray field capture using focal plane sweeping and its optical reconstruction using 3D displays*" by J.-H. Park et al., published in OPTICS EXPRESS, Vol. 22, No. 21, in October 2014, may be used to achieve the acquisition of 4D light field data by means of a conventional camera.

There are several ways to represent 4D light-field data. Indeed, in the Chapter 3.3 of the Ph.D dissertation thesis entitled "*Digital Light Field Photography*" by Ren Ng, published in July 2006, three different ways to represent 4D light-field data are described. Firstly, 4D light-field data can be represented, when recorded by a plenoptic camera by a collection of micro-lens images. 4D light-field data in this representation are named raw images or raw 4D light-field data. Secondly, 4D light-field data can be represented, either when recorded by a plenoptic camera or by a camera array, by a set of sub-aperture images. A sub-aperture image corresponds to a captured image of a scene from a point of view, the point of view being slightly different between two sub-aperture images. These sub-aperture images give information about the parallax and depth of the imaged scene. Thirdly, 4D light-field data can be represented by a set of epipolar images see for example the article entitled: "*Generating EPI Representation of a 4D Light Fields with a Single Lens Focused Plenoptic Camera*", by S. Wanner and al., published in the conference proceedings of ISVC 2011.

There are several types of plenoptic devices and camera arrays available on the market, and all these light field acquisition devices have their proprietary file format. Thus it appears that light-field technology cannot live besides regular 2D or 3D imaging as there is no standard supporting the acquisition and transmission of multi-dimensional information. The present invention has been devised with the foregoing in mind.

SUMMARY OF THE INVENTION

According to a first aspect of the invention there is provided an apparatus for calibrating an optical acquisition system, said apparatus comprising a processor configured to
  computing, in an image space of the optical acquisition system, parameters defining
    a first ray of light passing through a centre of a pixel of a sensor of said optical acquisition system and a centre of a pupil of said optical acquisition, and
    a second ray of light passing through two points belonging to a surface of a volume occupied by a set of rays of light passing through the pupil of said optical acquisition system and the pixel of the sensor of said optical acquisition system, a first point of said second ray belonging to a sensor plane of the optical acquisition system and a second point of said second ray belonging to a pupil plane,
  computing parameters of the conjugates of the first ray of light and the second ray of light in an object space of the optical acquisition system, the conjugate of the second ray of light said collection generating a surface of a volume occupied by a set of rays of light passing through a pupil of said optical acquisition system and a conjugate of said pixel by rotating around the conjugate of the first ray of light, said volume occupied by said set of rays of light being called a pixel beam.

According to an embodiment of the invention, the parameters defining a ray comprise coordinates of a point through which the ray is passing and a set of direction cosines of a direction vector defining said ray in a coordinate system comprising three coordinates axes.

According to an embodiment of the invention, the parameters defining the first ray are the coordinates ($x_p$, $y_p$, $z_p$) of the centre of the pixel and the set of direction cosines:

$$\begin{cases} l = \dfrac{x_p}{w} \\ m = \dfrac{y_p}{w} \quad \text{with } w = \sqrt{x_p^2 + y_p^2 + z_p^2} \\ n = \dfrac{z_p}{w} \end{cases}$$

the origin of the coordinate system being the centre of the pupil.

According to an embodiment of the invention, the parameters defining the second ray are the coordinates of the first point located in the sensor plane and belonging to a circle of radius a centred on the pixel and the set of direction cosines:

$$\begin{cases} l = \dfrac{-x'_p}{w} \\ m = \dfrac{\sqrt{r^2 - a^2} - y'_p}{w} \quad \text{with } w = \sqrt{x'^2_p + \left(\sqrt{r^2 - a^2} - y'_p\right)^2 + z^2_p} \\ n = \dfrac{-z_p}{w} \end{cases}$$

the origin of the coordinate system being the centre of the pupil.

According to an embodiment of the invention, the processor is configured to compute the parameters of the conjugates of the first ray of light and the second ray of light in an object space of the optical acquisition system consists in tracing the first ray and the second ray in the object space based on the parameters defining said first ray and said second ray in the image space and on design parameters of the optical.

Another object of the invention concerns a method for calibrating an optical acquisition system, comprising:
 computing, in an image space of the optical acquisition system, parameters defining
  a first ray of light passing through a centre of a pixel of a sensor of said optical acquisition system and a centre of a pupil of said optical acquisition, and
  a second ray of light passing through two points belonging to a surface of a volume occupied by a set of rays of light passing through the pupil of said optical acquisition system and the pixel of the sensor of said optical acquisition system, a first point of said second ray belonging to a sensor plane of the optical acquisition system and a second point of said second belonging to a pupil plane,
 computing parameters of the conjugates of the first ray of light and the second ray of light in an object space of the optical acquisition system, the conjugate of the second ray of light said collection generating a surface of a volume occupied by a set of rays of light passing through a pupil of said optical acquisition system and a conjugate of said pixel by rotating around the conjugate of the first ray of light, said volume occupied by said set of rays of light being called a pixel beam.

According to an embodiment of the invention, the parameters defining a ray comprise coordinates of a point through which the ray is passing and a set of direction cosines of a direction vector defining said ray in a coordinate system comprising three coordinates axes.

According to an embodiment of the invention, the parameters defining the first ray are the coordinates $(x_p, y_p, z_p)$ of the centre of the pixel and the set of direction cosines:

$$\begin{cases} l = \dfrac{x_p}{w} \\ m = \dfrac{y_p}{w} \quad \text{with } w = \sqrt{x^2_p + y^2_p + z^2_p} \\ n = \dfrac{z_p}{w} \end{cases}$$

the origin of the coordinate system being the centre of the pupil.

According to an embodiment of the invention, the parameters defining the second ray are the coordinates of the first point located in the sensor plane and belonging to a circle of radius a centred on the pixel and the set of direction cosines:

$$\begin{cases} l = \dfrac{-x'_p}{w} \\ m = \dfrac{\sqrt{r^2 - a^2} - y'_p}{w} \quad \text{with } w = \sqrt{x'^2_p + \left(\sqrt{r^2 - a^2} - y'_p\right)^2 + z^2_p} \\ n = \dfrac{-z_p}{w} \end{cases}$$

the origin of the coordinate system being the centre of the pupil.

According to an embodiment of the invention, computing the parameters of the conjugates of the first ray of light and the second ray of light in an object space of the optical acquisition system consists in tracing the first ray and the second ray in the object space based on the parameters defining said first ray and said second ray in the image space and on design parameters of the optical system.

Another object of the invention is a light field imaging device comprising:
 an array of micro lenses arranged in a regular lattice structure;
 a photosensor configured to capture light projected on the photosensor from the array of micro lenses, the photosensor comprising sets of pixels, each set of pixels being optically associated with a respective micro lens of the array of micro lenses; and
 a device for calibrating said light field imaging device in accordance with the invention.

Another object of the invention is a digital file comprising calibration data of an optical acquisition system, said calibration data comprising:
 parameters of a conjugate of a first ray of light, in an object space of the optical acquisition system, said a first ray of light passing through a centre of a pixel of a sensor of said optical acquisition system and a centre of a pupil of said optical acquisition,
 parameters of a conjugate a second ray of light, in the object space of the optical acquisition system, said second ray of light comprising a first point of said second ray belonging to a sensor plane of the optical acquisition system and a second point of said second belonging to a pupil plane,
the conjugate of the second ray of light said collection generating a surface of a volume occupied by a set of rays of light passing through a pupil of said optical acquisition system and a conjugate of said pixel by rotating around the conjugate of the first ray of light, said volume occupied by said set of rays of light being called a pixel beam.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system'. Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

As will be appreciated by one skilled in the art, aspects of the present principles can be embodied as a system, method or computer readable medium. Accordingly, aspects of the present principles can take the form of an entirely hardware embodiment, an entirely software embodiment, (including firmware, resident software, micro-code, and so forth) or an embodiment combining software and hardware aspects that can all generally be referred to herein as a "circuit", "module", or "system". Furthermore, aspects of the present principles can take the form of a computer readable storage medium. Any combination of one or more computer readable storage medium(a) may be utilized.

For any optical acquisition system, may it be plenoptic or not, in addition to raw images or epipolar images representing 4D light-field data captured by the optical acquisition system, it is interesting to obtain information related to a correspondence between pixels of a sensor of said optical acquisition system and an object space of said optical acquisition system. Knowing which portion of the object space of an optical acquisition system a pixel belonging to the sensor of said optical acquisition system is sensing enables the improvement of signal processing operations such as de-multiplexing, de-mosaicking, refocusing, etc., and the mixing of images captured by different optical systems with different characteristics. Furthermore, information related to the correspondence between the pixels of the sensor of the optical acquisition system and the object space of said optical acquisition system are independent of the optical acquisition system.

Figure 2:
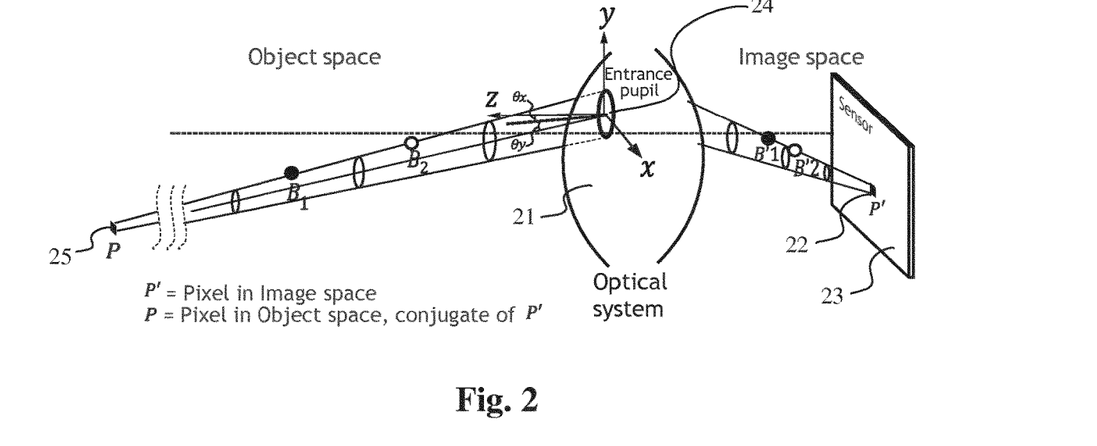
FIG. 2 represents a volume occupied by a set of rays of light in an object space of an optical system of a camera or optical acquisition system.

The present disclosure introduces the notion of pixel beam 10, shown on FIG. 2, which represents a volume occupied by a set of rays of light in an object space of an optical system 11 of a camera or optical acquisition system (not shown on FIG. 2). The set of rays of light is sensed by a pixel 22 of a sensor 23 of the camera through a pupil 24 of said optical system 21. The optical system 21 may be a combination of lenses fit for photo or video cameras. An entrance pupil of an optical system is defined as the image of an aperture stop as seen through defined lenses of said optical system, i.e. the lenses of the optical acquisition system, which precede said aperture stop. An aperture stop is an opening which limits the amount of light which passes through the optical system of the optical acquisition system.

For example, an adjustable diaphragm located near the front of a camera lens is the aperture stop for the lens. The amount of light admitted through the diaphragm is controlled by the diameter of the diaphragm opening which may adapted depending of the amount of light a user of the camera wishes to admit. For example, making the aperture smaller reduces the amount of light admitted through the diaphragm, but increases the depth of focus. The effective size of a stop may be larger or smaller than its physical size because of the refractive action of a lenses. Formally, a pupil is the image of the aperture stop through preceding lenses of the optical system of the optical acquisition system.

A pixel beam 10 is defined as a pencil of rays of light that reach a given pixel 22 when propagating through the optical system 21 via an entrance pupil 24. As light travels on straight lines in free space, the shape of such a pixel beam 20 can be defined by two sections, one being the conjugate 25 of the pixel 22, and the other being the entrance pupil 24. The pixel 22 is defined by its non-null surface and its sensitivity map.

Figure 3:
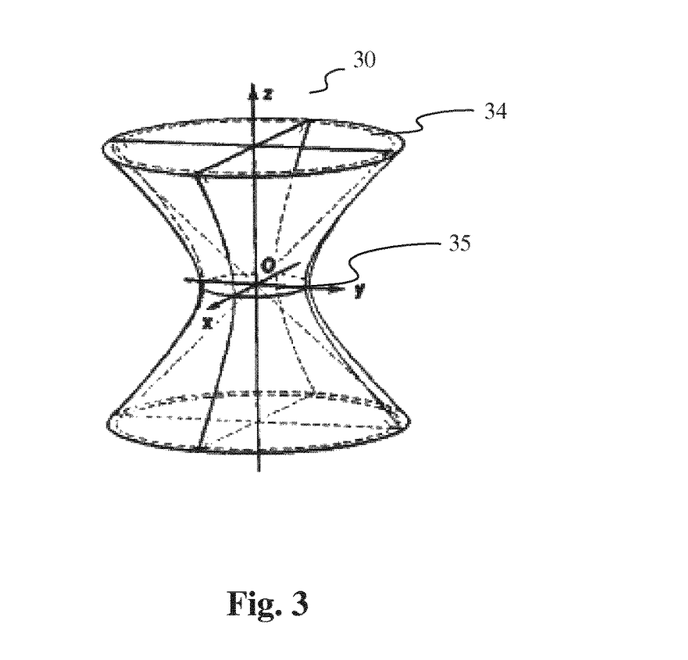
FIG. 3 represents a hyperboloid of one sheet.

Thus, a pixel beam 30 may be represented by an hyperboloid of one sheet, as shown on FIG. 3, supported by two elements: the pupil 34 and the conjugate 35 of the pixel 22 in the object space.

A hyperboloid of one sheet is a ruled surface that can support the notion of pencil of rays of light and is compatible with the notion of "étendue" of physical light beams, i.e. the preservation of energy across sections of the physical light beams.

A hyperboloid of one sheet corresponds to the geometry of a Gaussian beam. Indeed, in optics, a Gaussian beam is a beam of monochromatic electromagnetic radiation whose transverse magnetic and electric field amplitude profiles are given by a Gaussian function; this also implies a Gaussian intensity profile. This fundamental transverse Gaussian mode describes an intended output of most lasers, since such a beam of light can be focused into the most concentrated spot.

The equations below assume a beam with a circular cross-section at all values of $z$; this can be seen by noting that a single transverse dimension, r, appears.

Figure 9:
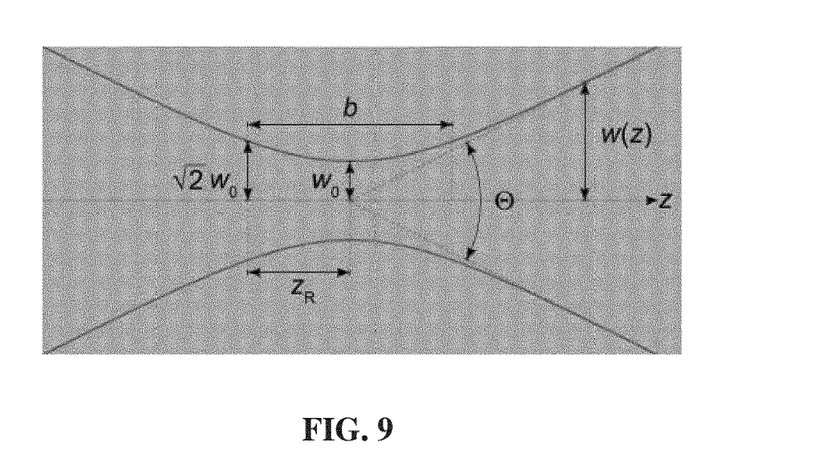
FIG. 9 represents the geometric shape of a Gaussian beam.

At a position $z$ along the beam (measured from the focus), the spot size parameter w is given by[1]

$$w(z) = w_0 \sqrt{1 + \left(\frac{z}{z_R}\right)^2}$$

where $w_0$ is the waist size.

As represented on FIG. 9, at a distance from the waist equal to $z_R$, the width w of the beam is equal to $\sqrt{2}w_0$.

Although the tails of a Gaussian function never actually reach zero, for. This means that far from the waist, the beam "edge" is cone-shaped. The angle between lines along that cone (whose r=w(z)) and the central axis of the beam (r=0) is called the divergence of the beam.

The total angular spread of the beam far from the waist is then given by $\Theta=2\theta$.

Figure 4:
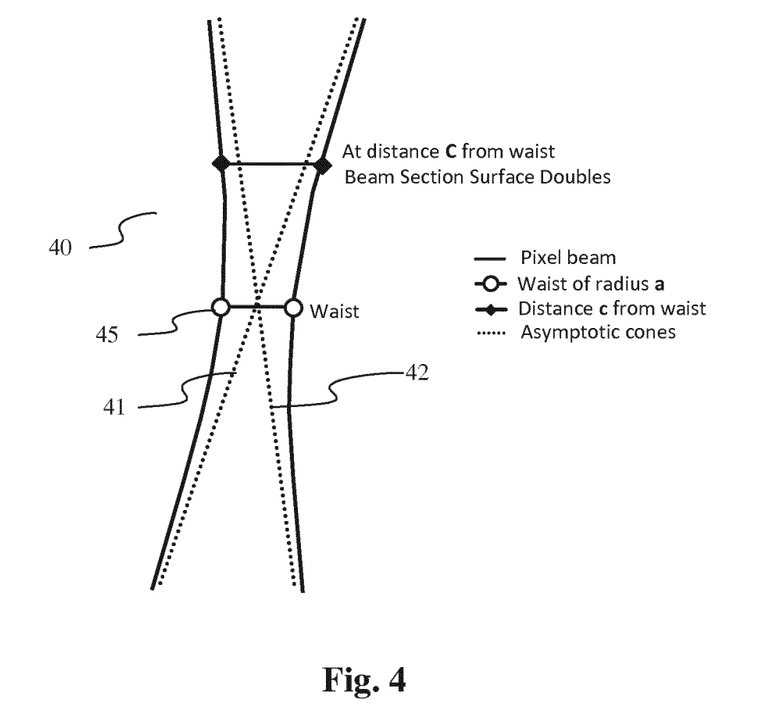
FIG. 4 represents another view of a hyperboloid of one sheet.

As represented on FIG. 4, a hyperboloid of one sheet 40 is mostly identical to its asymptotic cones 41, 42, except in the fundamental region of its smallest section, called the waist 45, which corresponds to the pixel 22 in the object space. For plenoptic systems, such as light-field cameras, this is the region where space sampling by multiple path rays is performed. Sampling space with cones in this region is not adequate, as pixel 22 sensitivity is significant on some tens of square microns on its surface and cannot be represented by a mathematical point with infinitely small surface as would be a cone tip.

Figure 5:
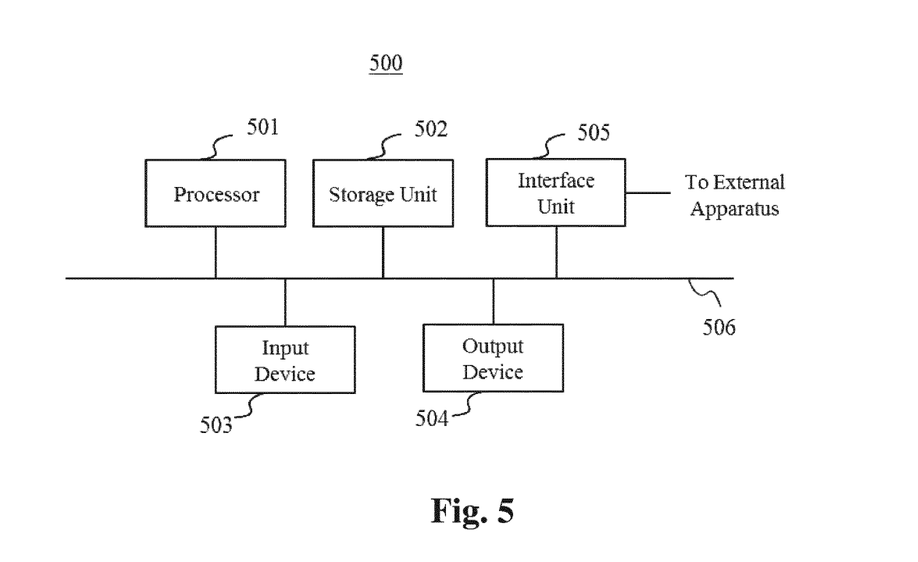
FIG. 5 is a schematic block diagram illustrating an example of an apparatus for calibrating an optical acquisition system according to an embodiment of the present disclosure.

FIG. 5 is a schematic block diagram illustrating an example of an apparatus for calibrating an optical acquisition system according to an embodiment of the present disclosure.

The apparatus 500 comprises a processor 501, a storage unit 502, an input device 503, a display device 504, and an interface unit 505 which are connected by a bus 506. Of course, constituent elements of the computer apparatus 500 may be connected by a connection other than a bus connection.

The processor 501 controls operations of the apparatus 500. The storage unit 502 stores at least one program capable of calibrating the optical acquisition system to be executed by the processor 501, and various data, including parameters related to rays defining the pixel beams 10, 20, 30, 40 of the optical acquisition system or parameters related to the optical system 21 of the optical acquisition system, parameters used by computations performed by the processor 501, intermediate data of computations performed by the processor 501, and so on. The processor 501 may be formed by any known and suitable hardware, or software, or a combination of hardware and software. For example, the processor 501 may be formed by dedicated hardware such as a processing circuit, or by a programmable processing unit such as a CPU (Central Processing Unit) that executes a program stored in a memory thereof.

The storage unit 502 may be formed by any suitable storage or means capable of storing the program, data, or the like in a computer-readable manner. Examples of the storage unit 502 include non-transitory computer-readable storage media such as semiconductor memory devices, and magnetic, optical, or magneto-optical recording media loaded into a read and write unit. The program causes the processor 501 to perform a process for calibrating the optical acquisition system according to an embodiment of the present disclosure as described hereinafter with reference to FIG. 6.

The input device 503 may be formed by a keyboard, a pointing device such as a mouse, or the like for use by the user to input commands, to make user's selections of parameters used for generating a parametric representation of a volume occupied by a set of rays of light in an object space of an optical system. The output device 504 may be formed by a display device to display, for example, a Graphical User Interface (GUI), or files comprising the parameters of the different pixel beams computed by the processor 501 during the calibration of the optical acquisition system according to an embodiment of the present disclosure. The input device 503 and the output device 504 may be formed integrally by a touchscreen panel, for example.

The interface unit 505 provides an interface between the apparatus 500 and an external apparatus. The interface unit 505 may be communicable with the external apparatus via cable or wireless communication. In an embodiment, the external apparatus may be an optical acquisition system.

Figure 6:
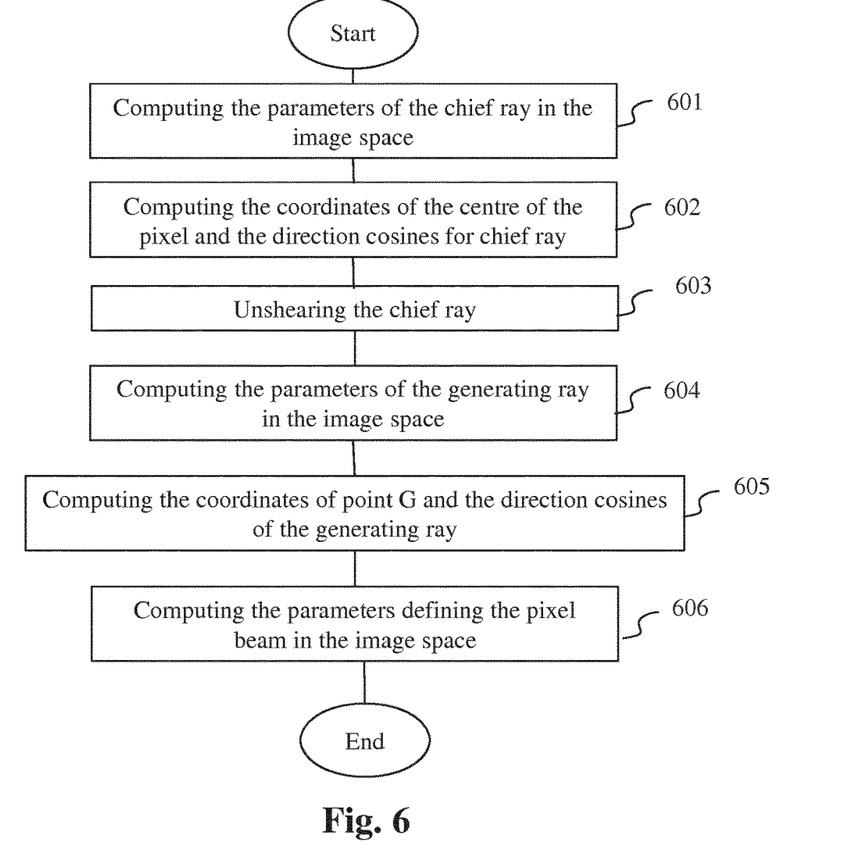
FIG. 6 is a flow chart for explaining a process for calibrating the optical acquisition system according an embodiment of the invention.

FIG. 6 is a flow chart for explaining a process for calibrating the optical acquisition system according an embodiment of the invention.

Such a calibrating method enables to obtain parameters defining the different pixel beams associated to the pixels of the sensor 23 of the optical acquisition system.

A pixel beam 10, 20, 30, 40 is represented as a hyperboloid of one sheet. The general equation of a hyperboloid of one sheet an axis z of a coordinate system comprising three coordinates axes x, y, z is:

$$\frac{x^2}{a^2}+\frac{y^2}{a^2}-\frac{(z-z_p)^2}{c^2}=1 \quad (1)$$

where $z_p$ is the position of the waist 35 of the pixel beam on the z axis, a, a and c are the length of the semi-axes of the hyperboloid along the x, y and z axes respectively and are homologous to the length of semi-axes along Ox, Oy, Oz respectively, where a represents the radius of the of waist along Ox; b represents the radius of the waist along Oy and c defines an angular aperture of the pixel beam. In some embodiments of the invention, a and b have identical values, in these cases, the waist has a circular shape. The origin of the coordinate system being the centre of the pupil which coordinates are (0, 0, 0).

Figure 7:
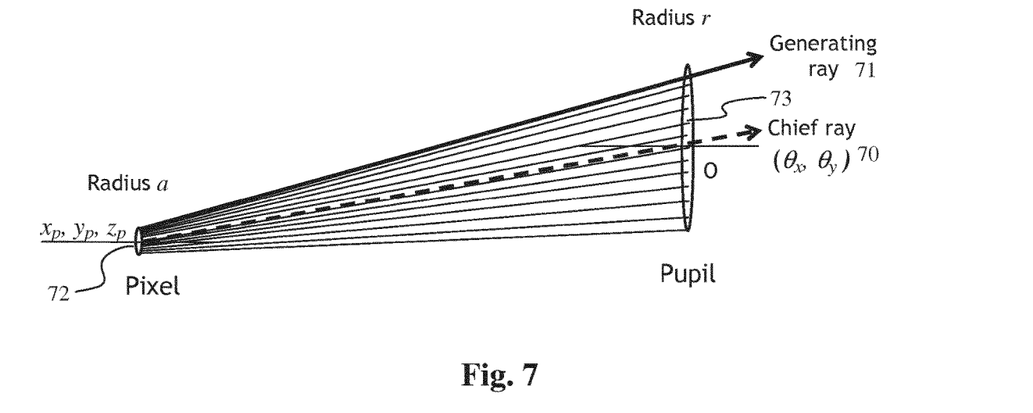
FIG. 7 represents a chief ray and a generating ray defining a pixel beam according to an embodiment of the invention.

As represented on FIG. 7, in the image space of the optical acquisition system, i.e. the portion of space located between the optical system 21 and the sensor 23 of the optical acquisition system, a pixel beam is represented by two rays a chief ray 70 and a generating ray 71. A chief ray 70 is a straight line passing through the centre of the pixel 72 which coordinates in the coordinates system (x, y, z) are $(x_{P\,p}, y_{P\,p}, z_{P\,p})$ and the centre of the pupil 73 which coordinates are (0, 0, 0).

As a ruled surface, a hyperboloid can be generated by generating rays 71. The generating rays are straight lines describing the surface of the hyperboloid. A generating ray 71 is a straight line passing through two points belonging to the surface of the hyperboloid, a first point belonging to a plane of the sensor 23 of the optical acquisition system and the surface of the hyperboloid, and a second point belonging to a plane of the pupil 73 and the surface of the hyperboloid. The chief ray of a hyperboloid and the generating rays describing its surface are not parallel to each other and they never intercept each other.

A straight line can be defined by six parameters: the three coordinates $(x_P, y_P, z_P)$ of a point through which the straight line is passing and three direction cosines (l, m, n) of a direction vector defining said straight line in the coordinate system.

In a step 601, the processor 501 computes the parameters defining the chief ray 70 in the image space of the optical acquisition system.

A hyperboloid which chief ray is oriented in direction $(\theta_x, \theta_y)$ is defined by the following equation:

$$\frac{(x-z.t_x)^2}{a^2}+\frac{(y-z.t_y)^2}{a^2}-\frac{(z-z_p)^2}{c^2}=1 \quad (2)$$

where $t_x=\tan\theta x$ and $t_y=\tan\theta y$.

In that case, the chief ray 70 is defined by:

$$\begin{cases} x = z \cdot t_x \\ y = z \cdot t_y \end{cases} \Leftrightarrow \begin{cases} x = z \cdot \frac{x_p}{z_p} \\ y = z \cdot \frac{y_p}{z_p} \end{cases} \Leftrightarrow y = x \frac{y_p}{x_p} \quad (3)$$

where $(x_{p\,p}, y_{p\,p}, z_{\,p})$ are the coordinates of the centre of the pixel 22 in the coordinate system.

The direction cosines of the direction vector defining the chief ray are thus:

$$\begin{cases} l = \frac{x_p}{w} \\ m = \frac{y_p}{w} \quad \text{with } w = \sqrt{x_p^2 + y_p^2 + z_p^2} \\ n = \frac{z_p}{w} \end{cases} \quad (4)$$

the origin of the coordinate system being the centre of the pupil.

Thus in a step 602, the processor 501 computes the values of the of the coordinates of the centre of the pixel 22 and the values of the directions cosines defining the chief ray of the pixel beam associated to the pixel 22 based on equation (4) and the parameters of the optical system 21 of the optical acquisition system such as the distance between a pupil and the pixel 22 defining the pixel beam.

The parameters defining the chief ray of the pixel beam computed during step 602 are stored in the storage unit 502 of the apparatus 500.

In a step 603, the processor 501 computes a correction of the shear of the chief ray 70. The unshearing of the chief ray consists in writing: (5):

$x'=x-z \cdot t_x$ and $y'=y-z \cdot t_y$, and $x_p'=x_p-z \cdot t_x$ and $y_p'= y_p-z \cdot t_x$ In a step 604, the processor computes the parameters defining the generating ray 71 in the image space of the optical acquisition system.

Let us consider the following equation:

$$\frac{x'^2}{a^2} + \frac{y'^2}{a^2} - \frac{(z-z_p)^2}{c^2} = 1 \text{ with } c^2 = \frac{a^2 z_p^2}{r^2 - a^2} \quad (5)$$

where r is the radius of the pupil.

Figure 8:
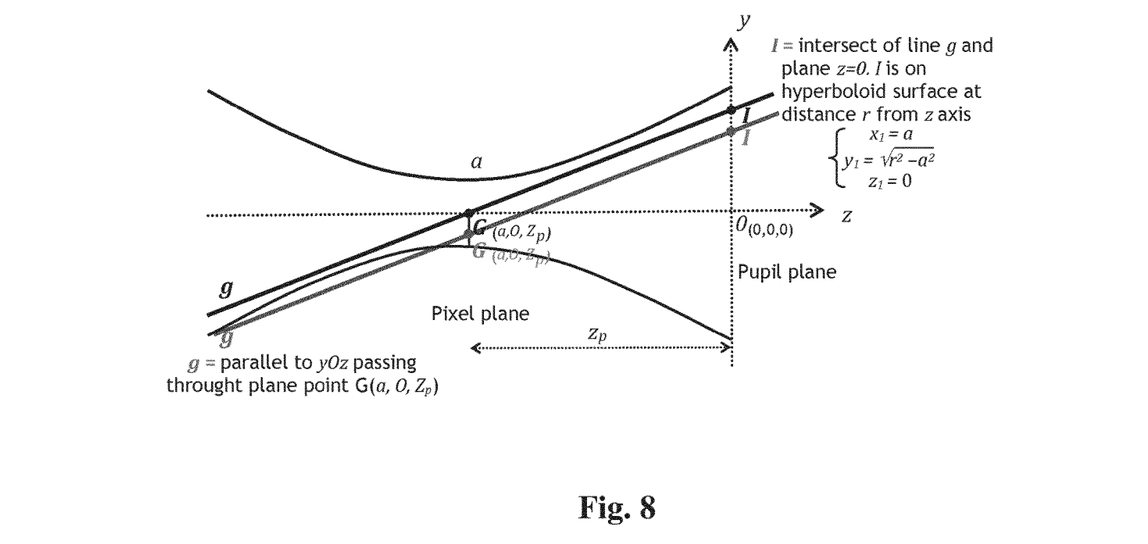
FIG. 8 represents a generating ray defining a pixel beam according to an embodiment of the invention.

In reference to FIG. 8, let us consider a straight line $g$ parallel to a plane $y_p O z_p$. The straight line $g$ passes through point G which coordinates in the coordinates system are (a, 0, $z_p$).

The straight line $g$ is thus defined by the two points: G which coordinates are (a, 0, $z_p$) and I which coordinates are (a, $\sqrt{r^2-r^2}$, 0).

The coordinates of vector $\overrightarrow{IG}$ defining the straight line g are:

$v_x=0, v_y=\sqrt{r^2-a^2}, v_z=-z_p$

Thus the direction cosines of vector $\overrightarrow{IG}$ are:

$$l = 0, m = \frac{\sqrt{r^2 - a^2}}{\sqrt{r^2 - a^2 + z_p^2}}, n = \frac{-z_p}{\sqrt{r^2 - a^2 + z_p^2}}$$

When the pixel plane is shifted by $(+x_p', +y_p')= (z_p\,t_x, z_p\,t_y)$, the straight line g passes through points G which coordinates are $(x_p'+a, y_p', z_p)$ and point I which coordinates are (a, $\sqrt{r^2-a^2}$, 0).

The coordinates of vector $\overrightarrow{IG}$ defining the straight line g are:

$v_x=-x_p', v_y=\sqrt{r^2-a^2}-y_p', v_z=-z_p$

Thus the direction cosines of vector $\overrightarrow{IG}$ are:

$$l = \frac{-x_p'}{w}, m = \frac{\sqrt{r^2 - a^2} - y_p'}{w}, \quad (6)$$

$$n = \frac{-z_p}{w} \text{ wiht } w = \sqrt{x_p'^2 + \left(\sqrt{r^2-a^2}-y_p'\right)^2 + z_p^2}$$

The generating ray 71 is defined by the coordinates ($x_p'+a$, $y_p'$, $z_p$) of point G and the direction cosines:

$$l = \frac{-x_p'}{w},$$

$$m = \frac{\sqrt{r^2 - a^2} - y_p'}{w}, \text{ and}$$

$$n = \frac{-z_p}{w}$$

$$\text{wiht } w = \sqrt{x_p'^2 + \left(\sqrt{r^2-a^2}-y_p'\right)^2 + z_p^2}.$$

Thus in a step 605, the processor 501 computes the values of the of the coordinates of point G and the values of the directions cosines defining the generating ray 71 of the pixel beam associated to the pixel 22 based on equation (6) and the parameters of the optical system 21 of the optical acquisition system such as the distance between a pupil and the pixel 22 defining the pixel beam.

The parameters defining the generating ray of the pixel beam computed during step 605 are stored in the storage unit 502 of the apparatus 500.

During a step 606, knowing the parameters representing the chief ray 70 and the generating ray 71 in the image space, the processor 501 computes the values of said parameters in the object space thus obtaining the parameters of the pixel beam.

This computation is realized for example with the processor 501 of the apparatus 500 running a program capable of modelling a propagation of rays of light through the optical system 11. Such a program is for example an optical design program such as Zemax©, ASAP© or Code V©. An optical design program is used to design and analyze optical systems 11. An optical design program models the propagation of rays of light through the optical system 11; and can model the effect of optical elements such as simple lenses, aspheric lenses, gradient index lenses, mirrors, and diffractive optical elements, etc. A library of commercial lenses is store in the storage unit 502 of the apparatus 500 and is accessible to the processor 501 when it executes the optical design program.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. An apparatus comprising:
at least one processor configured to determine calibration data for an optical acquisition system, wherein a pixel beam comprises a volume in an object space of the optical acquisition system occupied by a set of rays of light passing through a pupil of the optical acquisition system and a conjugate of at least one pixel of a sensor of the optical acquisition system in the object space of the optical acquisition system in a direction normal to a surface of the pupil, the pixel beam being represented by a first ray of light passing through a center of the pixel of the sensor of the optical acquisition system and a center of the pupil, and a second ray of light passing through two points belonging to a surface of the pixel beam, a first point of the second ray belonging to a sensor plane of the optical acquisition system and a second point of the second ray belonging to a pupil plane, and wherein the processor being configured to determine calibration data comprises the processor being configured to compute, in an image space of the optical acquisition system, parameters defining the first ray of light and the second ray of light based at least on coordinates of the center of the pixel, coordinates of the center of the pupil and coordinates of the at least two points defining the second ray of light; and
compute parameters of the conjugates of the first ray of light and the second ray of light in an object space of the optical acquisition system.

2. The apparatus according to claim 1 wherein the parameters defining a ray comprise coordinates of a point through which the ray is passing and a set of direction cosines of a direction vector defining the ray in a coordinate system comprising three coordinates axes.

3. The apparatus according to claim 2 wherein the parameters defining the first ray are the coordinates ($x_p$, $y_p$, $z_p$) of the center of the pixel and the set of direction cosines:

$$\begin{cases} l = \dfrac{x_p}{w} \\ m = \dfrac{y_p}{w} \\ n = \dfrac{z_p}{w} \end{cases} \text{ with } w = \sqrt{x_p^2 + y_p^2 + z_p^2}$$

the origin of the coordinate system being the center of the pupil.

4. The apparatus according to claim 2 wherein the parameters defining the second ray are the coordinates of the first point located in the sensor plane and belonging to a circle of radius a centered on the pixel and the set of direction cosines:

$$\begin{cases} l = \dfrac{-x'_p}{w} \\ m = \dfrac{\sqrt{r^2 - a^2} - y'_p}{w} \\ n = \dfrac{-z_p}{w} \end{cases} \text{ with } w = \sqrt{x'^2_p + \left(\sqrt{r^2 - a^2} - y'_p\right)^2 + z_p^2}$$

the origin of the coordinate system being the center of the pupil.

5. The apparatus according to claim 4 wherein the processor is configured to compute the parameters of the conjugates of the first ray of light and the second ray of light in an object space of the optical acquisition system comprises tracing the first ray and the second ray in the object space based on the parameters defining the first ray and the second ray in the image space and on design parameters of the optical acquisition system.

6. The apparatus of claim 1, wherein the optical acquisition system comprises a light-field acquisition system.

7. A method comprising:
determining calibration data for an optical acquisition system, wherein a pixel beam comprises a volume in an object space of the optical acquisition system occupied by a set of rays of light passing through a pupil of the optical acquisition system and a conjugate of at least one pixel of a sensor of the optical acquisition system in the object space of the optical acquisition system in a direction normal to a surface of the pupil, the pixel beam being represented by a first ray of light passing through a center of the pixel of the sensor of the optical acquisition system and a center of the pupil, and a second ray of light passing through two points belonging to a surface of the pixel beam, a first point of the second ray belonging to a sensor plane of the optical acquisition system and a second point of the second ray belonging to a pupil plane, and wherein determining the calibration data includes
computing, in an image space of the optical acquisition system, parameters defining the first ray of light and the second ray of light based at least on coordinates of the center of the pixel, coordinates of the center of the pupil and coordinates of the at least two points defining the second ray of light; and
computing parameters of the conjugates of the first ray of light and the second ray of light in an object space of the optical acquisition system.

8. The method according to claim 7 wherein the parameters defining a ray comprise coordinates of a point through which the ray is passing and a set of direction cosines of a direction vector defining the ray in a coordinate system comprising three coordinates axes.

9. The method according to claim 7 wherein the parameters defining the first ray are the coordinates ($x_p$, $y_p$, $z_p$) of the center of the pixel and the set of direction cosines:

$$\begin{cases} l = \dfrac{x_p}{w} \\ m = \dfrac{y_p}{w} \\ n = \dfrac{z_p}{w} \end{cases} \text{ with } w = \sqrt{x_p^2 + y_p^2 + z_p^2}$$

the origin of the coordinate system being the center of the pupil.

10. The method according to claim 7 wherein the parameters defining the second ray are the coordinates of the first point located in the sensor plane and belonging to a circle of radius a centered on the pixel and the set of direction cosines:

$$\begin{cases} l = \dfrac{-x'_p}{w} \\ m = \dfrac{\sqrt{r^2 - a^2} - y'_p}{w} \quad \text{with } w = \sqrt{x'^2_p + \left(\sqrt{r^2 - a^2} - y'_p\right)^2 + z'^2_p} \\ n = \dfrac{-z_p}{w} \end{cases}$$

the origin of the coordinate system being the center of the pupil.

11. The method according to claim 7 wherein computing the parameters of the conjugates of the first ray of light and the second ray of light in an object space of the optical acquisition system comprises tracing the first ray and the second ray in the object space based on the parameters defining the first ray and the second ray in the image space and on design parameters of the optical system.

12. A device for rendering an image from light field data acquired by an optical acquisition device calibrated based on calibration data determined in accordance with the method of claim 7.

13. Non-transitory computer-readable medium storing executable program instructions to cause a computer executing the instructions to perform the method of claim 7.

14. The method of claim 7, wherein the optical acquisition system comprises a light-field acquisition system.

15. A light field imaging device comprising:
an array of micro lenses arranged in a regular lattice structure;
a photosensor configured to capture light projected on the photosensor from the array of micro lenses, the photosensor comprising sets of pixels, each set of pixels being optically associated with a respective micro lens of the array of micro lenses; and
at least one processor configured to determine calibration data for the light field imaging device, wherein a pixel beam comprises a volume in an object space of the optical acquisition system occupied by a set of rays of light passing through a pupil of the optical acquisition system and a conjugate of at least one pixel of a sensor of the optical acquisition system in the object space of the optical acquisition system in a direction normal to a surface of the pupil, the pixel beam being represented by a first ray of light passing through a center of the pixel of the sensor of the optical acquisition system and a center of the pupil, and a second ray of light passing through two points belonging to a surface of the pixel beam, a first point of the second ray belonging to a sensor plane of the optical acquisition system and a second point of the second ray belonging to a pupil plane, and wherein the at least one processor being configured to determine calibration data comprises the at least one processor being configured to
compute, in an image space of the optical acquisition system, parameters defining the first ray of light and the second ray of light based at least on coordinates of the center of the pixel, coordinates of the center of the pupil and coordinates of the at least two points defining the second ray of light; and
compute parameters of the conjugates of the first ray of light and the second ray of light in an object space of the optical acquisition system.

16. A digital file comprising calibration data of an optical acquisition system, wherein a pixel beam comprises a volume in an object space of the optical acquisition system occupied by a set of rays of light passing through a pupil of the optical acquisition system and a conjugate of at least one pixel of a sensor of the optical acquisition system in the object space of the optical acquisition system in a direction normal to a surface of the pupil, the pixel beam being represented by a first ray of light passing through a center of the pixel of the sensor of the optical acquisition system and a center of the pupil, and a second ray of light passing through two points belonging to a surface of the pixel beam, a first point of the second ray belonging to a sensor plane of the optical acquisition system and a second point of the second ray belonging to a pupil plane, and wherein the calibration data comprises:
parameters defining the first ray of light and the second ray of light based at least on coordinates of the center of the pixel, coordinates of the center of the pupil and coordinates of the at least two points defining the second ray of light; and
parameters of the conjugates of the first ray of light and the second ray of light in an object space of the optical acquisition system.

17. The digital file of claim 16, wherein the optical acquisition system comprises a light-field acquisition system.

* * * * *